United States Patent [19]

Ziegenhain

[11] Patent Number: 4,458,492
[45] Date of Patent: Jul. 10, 1984

[54] METHOD FOR THE RECOVERY OF GEOTHERMAL ENERGY

[75] Inventor: William C. Ziegenhain, Ponca City, Okla.

[73] Assignee: Conoco Inc., Ponca City, Okla.

[21] Appl. No.: 890,359

[22] Filed: Mar. 27, 1978

Related U.S. Application Data

[63] Continuation of Ser. No. 546,584, Feb. 3, 1975, abandoned.

[51] Int. Cl.$^3$ .............................................. F03G 7/00
[52] U.S. Cl. ................................. 60/641.2; 60/641.3; 165/45
[58] Field of Search ................. 60/641.2, 641.3, 641.5, 60/651, 671, 649; 165/45

[56] References Cited

U.S. PATENT DOCUMENTS 3,827,243  8/1974  Paull et al. ............................ 60/641
3,864,917  2/1975  Jacoby ................................... 60/641

Primary Examiner—Allen M. Ostrager
Attorney, Agent, or Firm—Robert B. Coleman, Jr.; Richard W. Collins

[57] ABSTRACT

A method for the recovery of geothermal energy from subterranean formations comprising injecting a thermally stable, non-corrosive, non-aqueous fluid into said formation to absorb heat; recovering the heated fluid from the formation; and, recovering heat energy from the heated fluid.

10 Claims, 2 Drawing Figures

METHOD FOR THE RECOVERY OF GEOTHERMAL ENERGY

This is a continuation application Ser. No. 546,584, filed Feb. 3, 1975, now abandoned.

This invention relates to the recovery of geothermal energy from subterranean formations.

This invention further relates to the recovery of geothermal energy from subterranean formations using thermally stable non-corrosive, non-aqueous fluids.

This invention further relates to the recovery of geothermal energy in such a manner that scaling and corrosion in heat exchange equipment and the like is avoided.

This invention further relates to the recovery of geothermal energy in such a manner that formation solids are not dissolved in the injected fluids.

It is well known that in many parts of the world subterranean formations contain substantial amounts of heat. Such formations are quite noticeable and near the surface in areas such as Yellowstone Park and other places where geysers and the like are present at the surface.

One common method for tapping subterranean formations is to drill a well into a formation containing steam or hot water and producing the steam or hot water as an energy source. A second method less commonly used is to pump water into a hot formation to produce steam or hot water in situ. The steam or hot water is then removed by another pipe and used for thermal energy recovery.

Numerous methods are used for the recovery of thermal energy from the water or steam, the most common being the use of turbines to recover the energy in the form of electricity or heat exchangers which are used to transfer energy to another fluid for a variety of uses. In either event the production of steam or water and the recovery of energy therefrom presents considerable operating problems. Most of these problems originate from the dissolved impurities in the steam or hot water after contacting the underground formation. These impurities typically consist of salts such as silica compounds, calcium salts, magnesium salts, sodium salts, iron compounds and the like. Such salts can cause deposits on turbine blades or heat exchanger surfaces along with severe corrosion problems. In addition these impurities complicate disposal problems of the condensate and hot water sources after the thermal energy has been recovered.

Other attempts to avoid this problem have involved the positioning of a wellbore in a hot formation and thereafter positioning in a container at the bottom of the wellbore a first heat stable fluid which is then used to transfer heat from the formation to a second fluid contained in a heat exchanger, tubing or the like positioned in contact with said first fluid. Such methods merely move the location of the corrosion or scale problem since quite obviously as the heat is transferred from the formation to the container containing the thermally stable fluid, the scale will build up on the outer surfaces of the container in the formation itself as a result of the heat transfer at the surface. Accordingly, since new sources of energy are in considerable demand and since the problems associated with the use of hot water and steam as discussed above have inhibited the production of energy from geothermal formations an improved method has long been sought whereby the foregoing difficulties may be overcome.

It has now been found that geothermal energy is readily produced from subterranean formations without encountering such scaling and corrosion difficulties by injecting a thermally stable, non-corrosive, non-aqueous fluid into such formations to absorb heat therefrom and thereafter recovering the heated fluid from the formation and recovering energy from such heated fluid.

Figures 1, 2:
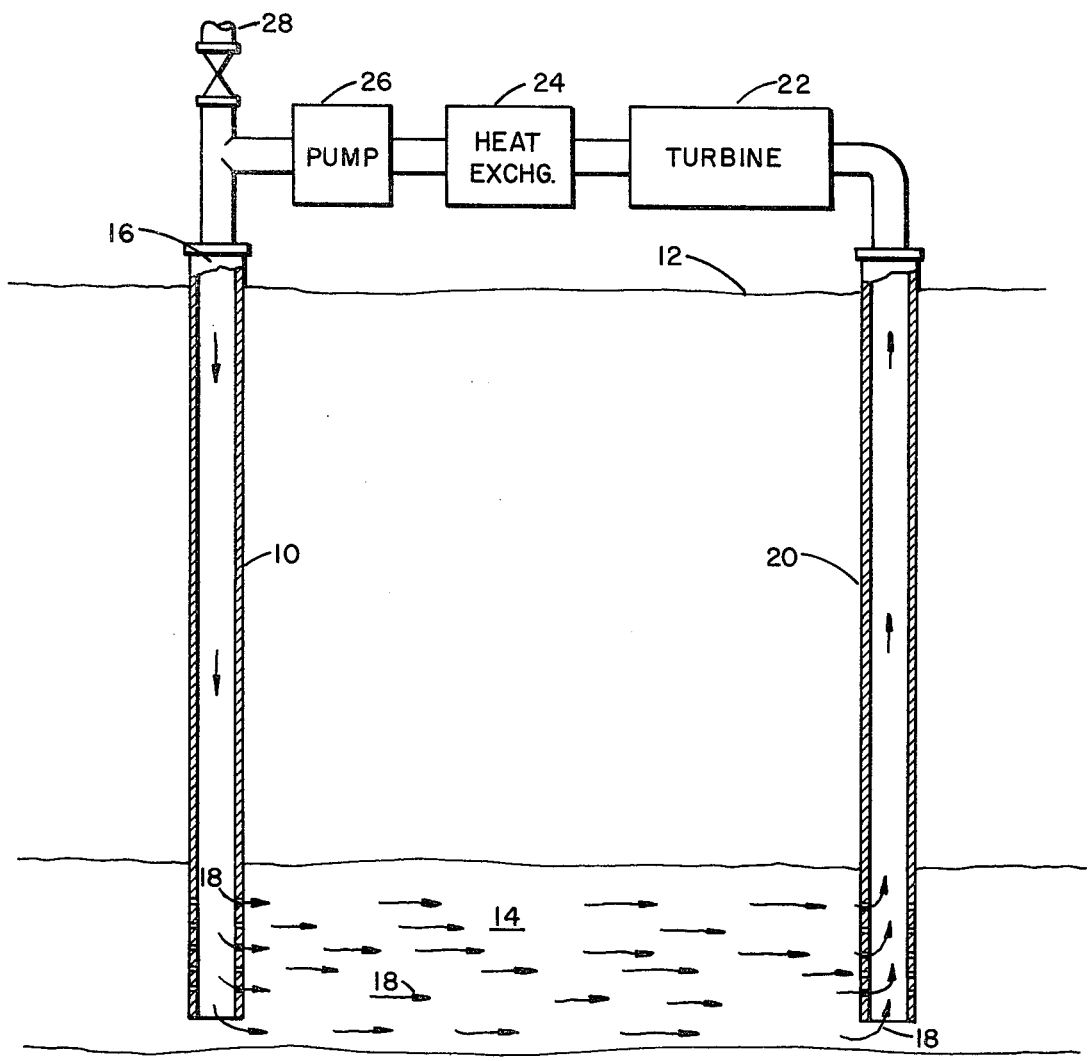
FIG. 1 shows an embodiment of the method of the present invention.
FIG. 2 shows a further embodiment of the present invention.

In the practice of the method of the present invention a thermally stable, non-corrosive, non-aqueous fluid is injected into a hot formation to absorb heat therefrom. The fluid is normally injected through a borehole or the like into the formation directly and recovered from a second borehole or the like. It is of course possible that such fluids could be injected into a borehole, sealed in, allowed to absorb heat and thereafter recovered from the same borehole by pumping, or the like. However, it is preferred that at least two boreholes be used so that fluid may be passed into and through the formation continuously. Of course, it may be necessary in some instances that the formation be fractured or the like as known to those skilled in the art so that the fluid is readily passed through the formation to absorb heat therefrom.

In the embodiment shown in FIG. 1, a fluid is passed through wellbore 10 from the surface 12 into a hot formation 14 to recover heat values therefrom. The fluid is injected at the top 16 of wellbore 10 through wellbore 10 into a hot subterranean formation 14 and through subterranean formation 14 as shown by arrows 18. The fluid is then recovered through a second wellbore 20 and passed to a turbine 22 where energy is recovered by the use of a fluid which has a high vapor pressure at the temperatures generated by the passage of the fluid through hot formation 14. The exhaust gases from turbine 22 are then passed to a heat exchanger 24 where they are used for the generation of steam and the like. The gases exiting from heat exchanger 24 are pumped by pump 26 back into wellbore 10 and recycled through formation 14. Make-up fluid as required is readily added through pipe 28.

As noted hereinbefore the primary difficulty in methods used heretofore has resided in the fouling of turbine blades, heat exchangers and the like by scale and the like which results from dissolved solids in aqueous media which has been in contact with the hot formation. Clearly, the difficulty is overcome by the method of the present invention wherein non-aqueous, non-corrosive thermally stable fluids are used.

In FIG. 2, a second embodiment of the present invention is shown wherein a plurality of injection wells 30 are used. The fluid is injected through injection wells 30 and recovered through a recovery well 32. Quite obviously such an arrangement facilitates the recovery of substantially all of the injected fluid even when the hot formation initially contains substantial amounts of water, steam and the like. Obviously such water, steam and the like when recovered with the fluids is desirably separated therefrom in the initial stages of the operation. It is anticipated that in most zones the injection of the fluids will result in the recovery and disposal of most of the water present initially so that subsequent operations will be unimpeded by the production of substantial amounts of water from the formation.

The boreholes may obviously be spaced at any suitable spacing or in any suitable pattern which is compatible with the permeability of the hot formation and the fluid used. Numerous factors will effect the spacing such as the permeability of the formation, the temperature of the formation, the desired temperature of the hot fluid produced from the formation and the like. Such variables are obviously known to those skilled in the art and are readily used to determine the proper spacing for any particular formation and a particular fluid.

The thermally stable non-corrosive, non-aqueous fluid is selected from fluids which are substantially non-reactive with the water-soluble, scale-forming materials found in such hot formations. Such fluids are hydrocarbon materials containing from 1 to about 40 carbon atoms, alkanes containing from 1 to about 40 carbon atoms, alcohols containing from 1 to about 30 carbon atoms, ketones containing from about 3 to about 30 carbon atoms, benzene, alkyaryl compounds containing from 7 to about 40 carbon atoms, halo hydrocarbons containing from 1 to about 30 carbon atoms, ammonia and the like. Of these alkanes containing from 1 to about 40 carbon atoms and mixtures thereof are preferred. Ammonia is also preferred in some instances because of its high specific heat. Some suitable materials are ammonia, ethane, propane, butane, isobutane, pentane, hexane, methanol, ethanol, propanol, butanol, acetone, benzene, toluene, xylene, glycol, kerosene, naptha, freons such as Freon 21 and 22 and the like. Quite obviously many fluids are suitable so long as they have a suitable boiling point, vapor pressure and are non-reactive with the chemical constituents of the hot formation, i.e. the fluid should not dissolve, suspend or otherwise remove formation solids as the fluid is passed through the formation and recovered. It is also desirable that the fluid be substantially non-corrosive so that no corrosion problems are created in the energy recovery equipment. As is well known to those skilled in the art the foregoing fluids are substantially non-reactive with materials normally found in the hot formations. Some such materials commonly found in such formations are silica compounds, calcium salts, magnesium salts, sodium salts, iron compounds and the like. As is well known, such materials are dissolved by water and cause scale deposits and corrosion in heat exchanger equipment and the like.

In the selection of a suitable fluid for a particular formation, the fluid is desirably selected from materials which do not react, dissolve or suspend formation solids so that the recovered heated fluid is substantially free of dissolved or suspended formation solids. Of the fluids which do not react, dissolve or suspend formation solids desirably those fluids having the higher specific heats are preferred. Of these those which vaporize at formation temperatures are preferred in many instances. For instance such fluids may be recovered at high pressures and used to drive turbines and the like in addition to heat exchange with other fluids and the like.

A further advantage of the present invention is that whereas water has substantially one vapor pressure-temperature curve, the fluids useful in the method of the present invention have a variety of temperature-pressure curves, for instance, it may be possible in a formation which has a maximum temperature of 210° F. to use a fluid such as which has a substantial vapor pressure at 210° F. to recover heat values from the formation, as by use of a turbine and the like whereas water would still be liquid at 210° F. and would present substantial problems in the recovery of heat values from such a formation. Numerous other variations and modifications within the scope of the present invention will be obvious to those skilled in the art in view of the list of fluids above and other like fluids known to those skilled in the art.

Obviously, the heated fluids, after recovery can be used for any purpose knwon to those skilled in the art such as driving turbines, exchanging heat through heat exchangers with other fluids and the like. For instance, in some instances it might be even be considered desirable to preheat fluids in a subterranean formation prior to combustion of the fluid.

Having thus described certain preferred embodiments, it is pointed out that the foregoing description of preferred embodiments is illustrative rather than limiting in nature and that many variations and modifications are possible within the scope of the present invention. It is anticipated that many such modifications and variations may be considered obvious or desirable to those skilled in the art upon a review of the foregoing description of preferred embodiments and the following example.

EXAMPLE

Propane is injected into a subterranean formation at ambient temperature and recovered at a temperature of approximately 206° F. Propane at 206° F. has a vapor pressure of 617 psia and is suitable for driving a turbine and the like.

Having thus described the invention, I claim:

1. A method of heating a fluid in a brine-containing geothermal reservoir formation penetrated by an injection well and a production well which comprises:
   (a) introducing an organic fluid having a low solubility in water into the formation through the said injection well,
   (b) forcing the said organic fluid through the said formation thereby heating the said fluid,
   (c) recovering the said heated organic fluid substantially free of brine through the said production well and wherein the temperature of the said geothermal reservoir formation is substantially above the temperature of the fluid introduced into the formation in step (a).

2. The method of claim 1 wherein the said organic fluid is a normally liquid hydrocarbon.

3. The method of claim 1 wherein the said organic fluid is a normally liquid hydrocarbon having from 4 to 10 inclusive carbon atoms.

4. The method of claim 1 wherein the said organic fluid is selected from the group consisting of propane, butane, pentane, hexane, heptane, octane, nonane, decane and isomers and mixtures thereof.

5. The method of claim 4 wherein the said organic fluid is n-propane.

6. The method of claim 1 wherein the said organic fluid is n-butane.

7. The method of claim 1 wherein the said organic fluid is isobutane.

8. The method of claim 1 wherein the said organic fluid is pentane.

9. The method of claim 1 wherein prior to step (a) the formation in the said injection well is hydraulically fractured.

10. The method of claim 1 wherein prior to step (a) the formation in both the said injection well and in the said production well is hydraulically fractured.

* * * * *